United States Patent
Mountain et al.

(10) Patent No.: US 7,730,473 B2
(45) Date of Patent: *Jun. 1, 2010

(54) RELIEVING DATA MARSHALLING OVERHEAD

(75) Inventors: Highland Mary Mountain, Gilbert, AZ (US); Guangyu Zhu, Beijing (CN); Hai Zhao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1362 days.

This patent is subject to a terminal disclaimer.

(21) Appl. No.: 10/880,081

(22) Filed: Jun. 30, 2004

(65) Prior Publication Data

US 2006/0004562 A1 Jan. 5, 2006

(51) Int. Cl.
G06F 9/44 (2006.01)

(52) U.S. Cl. ..................... 717/163
(58) Field of Classification Search ............... 717/136, 717/165, 130, 163; 707/100; 719/328, 330; 713/167

See application file for complete search history.

(56) References Cited

U.S. PATENT DOCUMENTS

| | | | |
|---|---|---|---|
| 6,298,391 B1 * | 10/2001 | Kennedy et al. ............ | 719/328 |
| 6,775,680 B2 * | 8/2004 | Ehrman et al. ............. | 717/136 |
| 6,980,997 B1 * | 12/2005 | Peschel-Gallee et al. .... | 717/165 |
| 6,996,809 B2 * | 2/2006 | Muhlestein et al. ......... | 717/130 |
| 7,203,833 B1 * | 4/2007 | Abadi et al. ................ | 713/167 |
| 7,240,346 B2 * | 7/2007 | Demsey et al. .............. | 718/1 |
| 7,418,718 B2 * | 8/2008 | Liu et al. .................... | 719/328 |
| 2005/0155044 A1 * | 7/2005 | Broussard et al. .......... | 719/330 |
| 2005/0229186 A1 * | 10/2005 | Mitchell et al. ............ | 719/315 |
| 2006/0085460 A1 * | 4/2006 | Peschel-Gallee et al. .... | 707/100 |

OTHER PUBLICATIONS

ECMA Standard ECMA-335, *Common Language Infrastructure (CLI)*, Dec. 2001.
D. Stutz, T. Neward and G. Shilling, *Shared Source CLI Essentials*, O'Reilly & Associates, Inc., 2003, pp. 75-81, Chaps. 5, 6, and 8.
Platt, D.S., ".NET Interop: Get Ready for Microsoft .NET by Using Wrappers to Interact with COM-based Applications," available at http://msdn.microsoft.com/msdnmag/issues/01/08/Interop/print.asp, updated Oct. 31, 2003.
S.R. Walli, "The Microsoft Shared Source CLI Implementation Refresh," available at http://msdn.microsoft.com/library/en-us/dndotnet/html/mssharsourcecli2.asp?frame=true, Jun. 2002.
D. Stutz, "The Microsoft Shared Source CLI Implementation," available at http://msdn.microsoft.com/library/en-us/dndotnet/html/mssharsourcecli.asp?frame=true, Mar. 2002.

* cited by examiner

*Primary Examiner*—Tuan Anh Vu
(74) *Attorney, Agent, or Firm*—Garrett IP, LLC

(57) ABSTRACT

Data may be marshalled from a managed runtime environment to an unmanaged environment by using a compiler to calculate argument offsets and generate marshalling language code.

9 Claims, 3 Drawing Sheets

RELIEVING DATA MARSHALLING OVERHEAD

BACKGROUND OF THE INVENTION

The number of applications under the control of managed runtime environments (MTREs), such as the Java Virtual Machine (JVM) and the Common Language Runtime (CLR), is increasing. These applications may need access to system components outside of the managed runtime environment. Such components may include legacy applications or components that provide access to platform-specific services. In the CLR, this kind of native code access may be performed by an invocation method that may have an overhead of between 10 and 30 x86 instructions per call, for example. In addition to this fixed cost, if the parameters or the return value of the called function need to be marshalled, the marshalling may create additional overhead depending on the type and size of the data, for example.

As the developer community migrates towards MTREs, unmanaged software components will need to be integrated into these new MTRE-based systems. However, low-level platform components and legacy applications will not be managed by these MTREs for quite some time. Several approaches for integrating these low-level components and legacy applications fail to provide an efficient and easy-to-use mechanism for allowing managed and unmanaged code to interact.

BRIEF DESCRIPTION OF THE DRAWINGS

Various exemplary features and advantages of embodiments of the invention will be apparent from the following, more particular description of exemplary embodiments of the present invention, as illustrated in the accompanying drawings wherein like reference numbers generally indicate identical, functionally similar, and/or structurally similar elements.

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

Exemplary embodiments of the present invention may provide a system and method for efficient data marshalling. As will be understood by a person having ordinary skill in the art, runtime applications or managed functions may need to execute native or unmanaged code. For example, a C# application or function may need to execute C++ or C code within a runtime application. When an application accesses code outside of the managed function, for example, data may be marshaled between the managed code and the unmanaged code. As will be understood by a person having ordinary skill in the art, a stub may provide a link between the managed and unmanaged code. As referred to herein, data marshalling may be the passing of data between managed code and unmanaged code.

Figure 1:
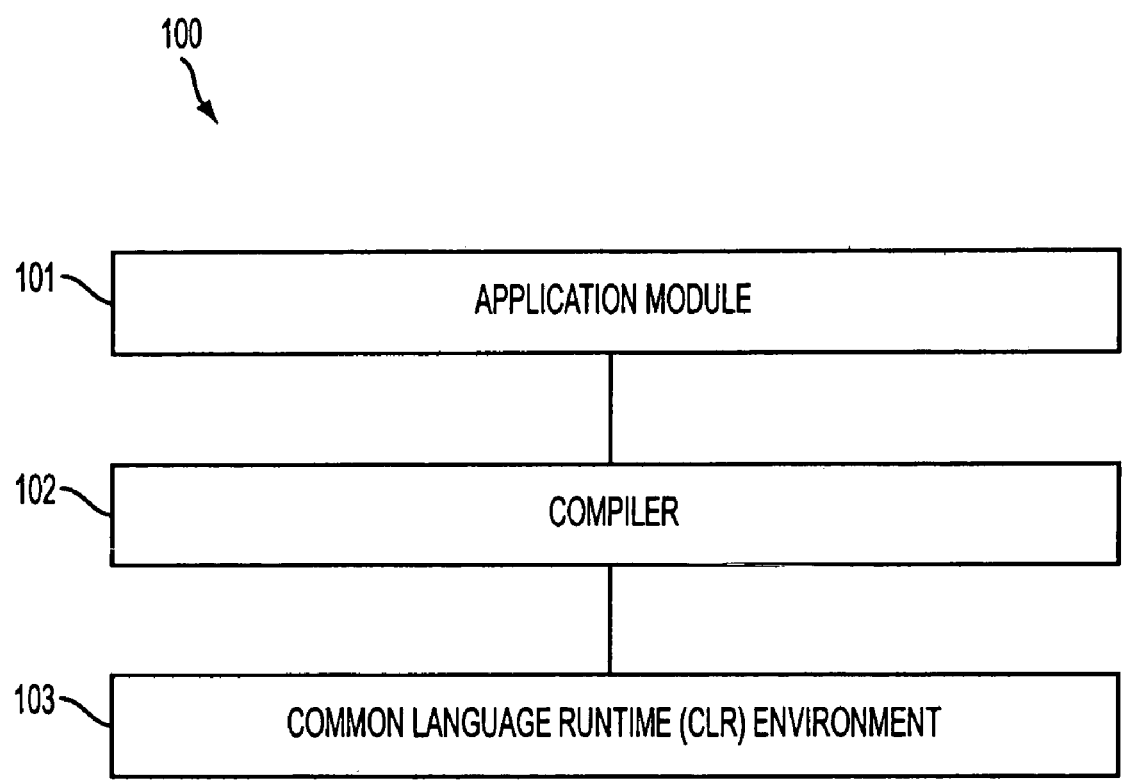
FIG. 1 depicts an exemplary embodiment of a system according to an exemplary embodiment of the invention.

FIG. 1 depicts an exemplary embodiment of a managed runtime architecture 100 for data marshalling according to exemplary embodiments of the invention. As shown in FIG. 1, data marshalling architecture 100 may include an application module 101, a compiler 102, and a common language runtime (CLR) environment 103. In an exemplary embodiment of the invention, application module 101 may store applications that may be executed within the CLR environment 103, for example. In an exemplary embodiment of the invention, these applications may need access to system components outside CLR environment 103 when they are executed.

As shown in FIG. 1, application module 101 may be coupled to compiler 102. In an exemplary embodiment of the invention, compiler 102 may analyze the applications that may be stored in application module 101 to create an intermediate language (IL) code. In other words, compiler 102 may compile the managed code of the applications that may be stored in application module 102. As will be understood by a person having ordinary skill in the art, in an exemplary embodiment of the invention, compiler 102 may be a C# (C-sharp) compiler.

In an exemplary embodiment of the invention, compiler 102 may be coupled to CLR environment 103. As will be understood by a person having ordinary skill in the art, CLR environment 103 may provide a virtual environment to execute applications in the runtime.

As discussed above, data marshalling may be a part of the calling of an unmanaged function within a managed runtime environment, for example. As will be understood by a person having ordinary skill in the art, to call an unmanaged function, CLR may 1) load a data link library (DLL) into memory and locate the address of the unmanaged function; 2) push arguments onto a stack and marshall arguments from the stack as needed; and 3) transfer control to the unmanaged function. In an exemplary embodiment of the invention, the managed runtime environment may use a native stub to marshall data, for example.

Figure 2:
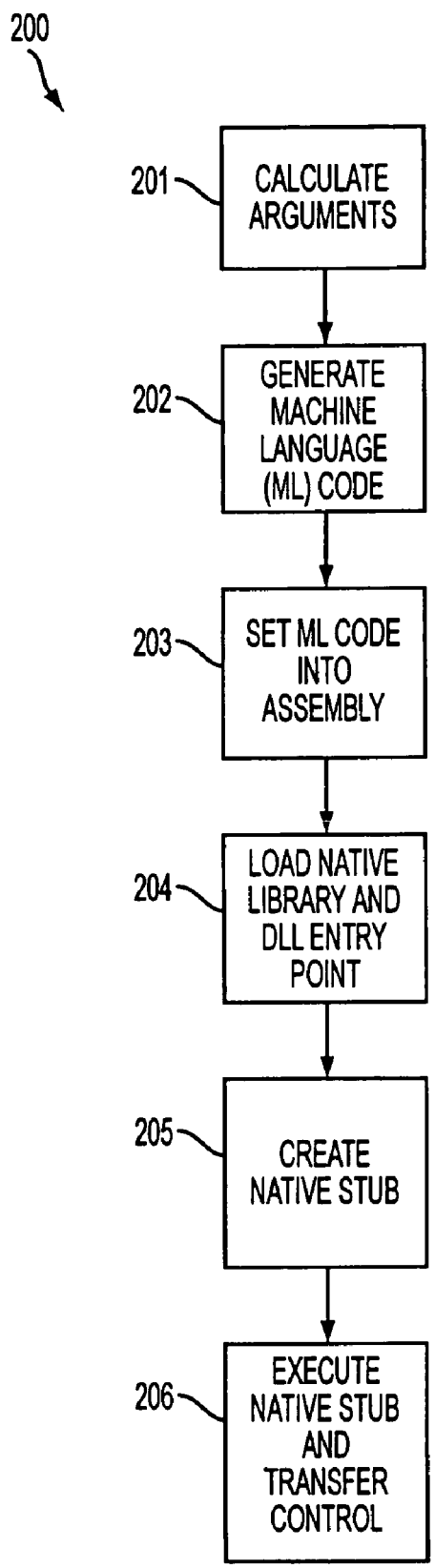
FIG. 2 depicts an exemplary embodiment of a method according to an exemplary embodiment of the invention.

FIG. 2 depicts flow chart 200, which illustrates an exemplary method for executing managed and unmanaged code using data marshalling according to exemplary embodiments of the invention. In block 201 arguments may be calculated. In an exemplary embodiment of the invention, a compiler, such as a C# compiler may calculate the argument offsets. As will be understood by a person having ordinary skill in the art, argument offsets may allow the managed runtime environment to understand the size of the arguments so that the arguments may be placed on a call stack.

In block 202, marshalling language (ML) code, which may be an intermediate code that a CLR developer may easily define, may be generated. In an exemplary embodiment of the invention, the ML code may be generated by the C# compiler, for example.

In block 203, the generated ML code may be set into assembly, for example by the C# compiler. As referred to herein, assembly may be a configured set of loadable code modules and other resources that together implement a unit of functionality.

In an exemplary embodiment of the invention, the ML code may be set into assembly together with metadata, for example, and other intermediate language code.

In block 204, a native library and DLL entry point may be loaded by a CLR, for example.

In block 205, a native stub may be created by the CLR, for example.

In block 206, the native stub may be executed and control may be changed to the native function.

Figure 3:
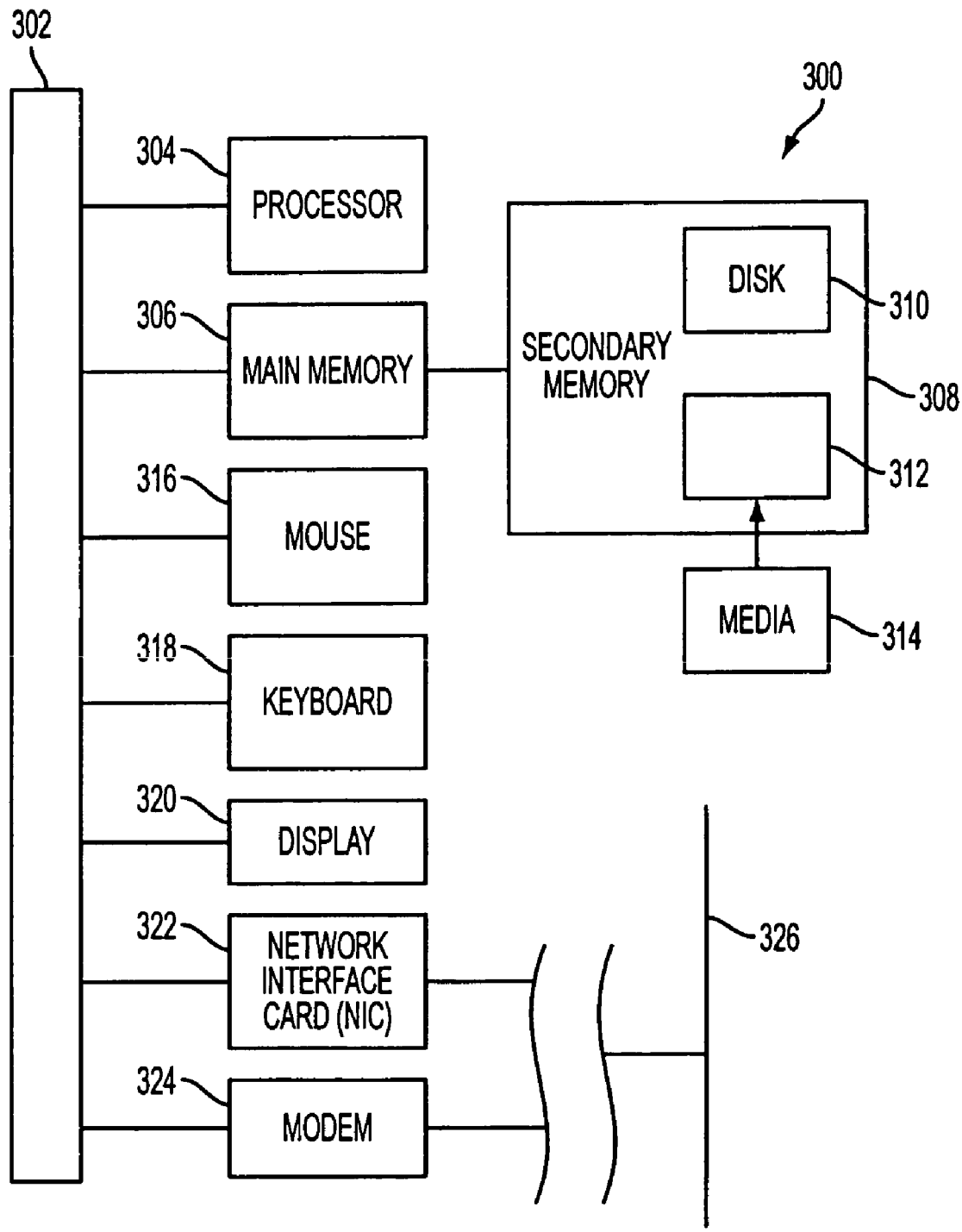
FIG. 3 depicts an exemplary embodiment of a computer and/or communications system as may be used for several components in an exemplary embodiment of the invention.

FIG. 3 depicts an exemplary embodiment of a computer and/or communications system as may be used for several components of the system in an exemplary embodiment of the present invention. FIG. 3 depicts an exemplary embodiment of a computer 300 as may be used for several computing devices in exemplary embodiments of the present invention. Computer 300 may include, but is not limited to: e.g., any computer device, or communications device including, e.g., a personal computer (PC), a workstation, a mobile device, a phone, a handheld PC, a personal digital assistant (PDA), a thin client, a fat client, an network appliance, an Internet browser, a paging, or alert device, a television, an interactive television, a receiver, a tuner, a high definition (HD) television, an HD receiver, a video-on-demand (VOD) system, a server, or other device.

Computer 300, in an exemplary embodiment, may comprise a central processing unit (CPU) or processor 304, which may be coupled to a bus 302. Processor 304 may, e.g., access main memory 306 via bus 302. Computer 300 may be coupled to an Input/Output (I/O) subsystem such as, e.g., a network interface card (NIC) 322, or a modem 324 for access to network 326. Computer 300 may also be coupled to a secondary memory 308 directly via bus 302, or via main memory 306, for example. Secondary memory 308 may include, e.g., a disk storage unit 310 or other storage medium. Exemplary disk storage units 310 may include, but are not limited to, a magnetic storage device such as, e.g., a hard disk, an optical storage device such as, e.g., a write once read many (WORM) drive, or a compact disc (CD), or a magneto optical device. Another type of secondary memory 308 may include a removable disk storage device 312, which may be used in conjunction with a removable storage medium 314, such as, e.g. a CD-ROM, or a floppy diskette. In general, the disk storage unit 310 may store an application program for operating the computer system referred to commonly as an operating system. The disk storage unit 310 may also store documents of a database (not shown). The computer 300 may interact with the I/O subsystems and disk storage unit 310 via bus 302. The bus 302 may also be coupled to a display 320 for output, and input devices such as, but not limited to, a keyboard 318 and a mouse or other pointing/selection device 316.

The embodiments illustrated and discussed in this specification are intended only to teach those skilled in the art various ways known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A system, including a computer to execute native code as unmanaged code from a common language runtime environment, comprising:

an application module including managed code applications;

a compiler to compile the managed code applications to an intermediate language that is executable in a virtual environment of the common language runtime environment, wherein one or more of the managed code applications include a call to an unmanaged native code function, wherein the compiler is configured to:

calculate argument offsets to pass arguments from the managed code to the unmanaged native code function, generate marshalling language code to marshall data between the managed code and the unmanaged native code function, and set the marshalling language code into an assembly, wherein the assembly is configured as a set of loadable modules, including the argument offsets, the intermediate language code of the managed code, and metadata; and a common language runtime system to host the virtual environment within the common language runtime environment, to execute the compiled managed code within the virtual environment, and to call the unmanaged native code function from the virtual environment in accordance with the assembly, including to perform the following within the virtual environment:

load a native library and a dynamic link library entry point into memory, locate an address of the unmanaged native code function, create a native stub to provide a link between the virtual environment and outside of the virtual environment, and execute the native stub and transfer control from the virtual environment to the outside of the virtual environment.

2. The system of claim 1, wherein the common language runtime system is further configured to perform the following within the virtual environment in response to the call to the unmanaged native code function, determine a size of the arguments from the argument offsets, and push the arguments onto a call stack in accordance with the size of the arguments.

3. The system of claim 1, wherein the compiler includes a C# compiler.

4. A computer program product including a computer readable medium having computer program logic thereon to cause a processor to perform functions in response thereto, the computer program logic comprising:

an application module including managed code applications;

compiler logic to cause the processor to compile the managed code applications to an intermediate language that is executable in a virtual environment of a common language runtime environment, wherein one or more of the managed code applications include a call to an unmanaged native code function, and wherein the compiler logic includes:

logic to cause the processor to calculate argument offsets to pass arguments from the managed code to the unmanaged native code function, logic to cause the processor to generate marshalling language code to marshall data between the managed code and the unmanaged native code function, and logic to cause the processor to set the marshalling language code into an assembly, wherein the assembly is configured as a set of loadable modules, including the argument offsets, the intermediate language code of the managed code, and metadata; and common language runtime logic to cause the processor to host the virtual environment of the common language runtime environment and to execute the compiled managed code within the virtual environment, including to call the unmanaged native code function from the virtual environment in accordance with the assembly, wherein the common language runtime logic includes:

logic to cause the processor to load a native library and a dynamic link library entry point into memory within the virtual environment, logic to cause the processor to locate an address of the unmanaged function within the virtual environment, logic to cause the processor to create a native stub in the virtual environment to provide a link between the virtual environment and outside of the virtual environment, and logic to cause the processor to execute the native stub from the virtual environment and to transfer control from the virtual environment to the outside of the virtual environment.

5. The computer program product of claim 4, wherein the common language runtime logic is configured to invoke the following additional logic within the virtual environment in response to the call to the unmanaged native code function:

logic to cause the processor to determine a size of the arguments from the argument offsets; and logic to cause the processor to push the arguments onto a call stack in accordance with the size of the arguments.

6. The computer program product of claim 4, wherein the compiler logic includes C# compiler logic.

7. A method, comprising:

storing managed code applications in a computer readable application module;

compiling the managed code applications in a computer system to an intermediate language that is executable in a virtual environment of a common language runtime environment of the computer system, wherein one or more of the managed code applications include a call to an unmanaged native code function, and wherein the compiling includes:

calculating argument offsets to pass arguments from the managed code to the unmanaged native code function, generating marshalling language code to marshall data between the managed code and the unmanaged native code function, and setting the marshalling language code into an assembly, wherein the assembly is configured as a set of loadable modules, including the argument offsets, the intermediate language code of the managed code, and metadata; and executing the managed code in the virtual environment of the managed runtime environment of the computer system, including calling the unmanaged native code function from within the virtual environment, wherein the calling of the unmanaged native code function includes:

loading a native library and a dynamic link library entry point into memory from the virtual environment, locating an address of the unmanaged function from the managed runtime virtual environment, creating a native stub in the virtual environment to provide a link between the virtual environment and outside of the virtual environment, executing the native stub from the virtual environment and transferring control from the virtual environment to the outside of the virtual environment.

8. The method of claim 7, wherein the calling of the unmanaged native code function further includes:

determining a size of the arguments from the argument offsets, in the virtual environment; and pushing the arguments onto a call stack from the virtual environment in accordance with the size of the arguments.

9. The method of claim 7, wherein the compiling is performed with a C# compiler.

\* \* \* \* \*